US009185902B1

(12) United States Patent
Mazzei, Sr.

(10) Patent No.: US 9,185,902 B1
(45) Date of Patent: Nov. 17, 2015

(54) CLAMPING DEVICE FOR CAMOUFLAGE

(71) Applicant: Mario Kenneth Mazzei, Sr., Eastchester, NY (US)

(72) Inventor: Mario Kenneth Mazzei, Sr., Eastchester, NY (US)

(*) Notice: Subject to any disclaimer, the term of this patent is extended or adjusted under 35 U.S.C. 154(b) by 0 days.

(21) Appl. No.: 14/585,245

(22) Filed: Dec. 30, 2014

(51) Int. Cl.
*A47G 7/00* (2006.01)
*A01M 31/02* (2006.01)
*F16M 11/14* (2006.01)
*F16M 13/02* (2006.01)
*F16M 11/38* (2006.01)
*A01M 31/00* (2006.01)

(52) U.S. Cl.
CPC ............ *A01M 31/025* (2013.01); *A01M 31/00* (2013.01); *F16M 11/14* (2013.01); *F16M 11/38* (2013.01); *F16M 13/022* (2013.01)

(58) Field of Classification Search
USPC ........................................... 248/530, 508, 87
See application file for complete search history.

(56) References Cited

U.S. PATENT DOCUMENTS

| | | | | |
|---|---|---|---|---|
| 276,791 A * | 5/1883 | Engle | ............................ | 248/515 |
| 558,296 A * | 4/1896 | McDonald | .................... | 248/515 |
| 3,237,899 A * | 3/1966 | Lewis | ............................. | 135/44 |
| 3,521,401 A * | 7/1970 | Shisler | ............................ | 47/43 |
| 3,843,083 A * | 10/1974 | Angibaud | ................. | 248/229.14 |
| 4,307,864 A * | 12/1981 | Benoit | ..................... | 248/222.11 |
| 5,037,052 A * | 8/1991 | Crisp et al. | ............... | 248/229.23 |
| 5,067,683 A * | 11/1991 | Wager | ........................... | 248/545 |
| 5,214,872 A * | 6/1993 | Buyalos, Jr. | ........................ | 43/1 |
| 5,489,076 A * | 2/1996 | Thomas | ........................ | 248/150 |
| 5,860,728 A * | 1/1999 | Maglica | ........................ | 362/191 |
| 6,296,005 B1 * | 10/2001 | Williams et al. | ................ | 135/98 |
| 6,431,192 B2 * | 8/2002 | O'Hare | ......................... | 135/125 |
| 6,631,527 B2 * | 10/2003 | Hyduk | ............................ | 5/417 |
| 6,702,239 B2 * | 3/2004 | Boucher | ....................... | 248/156 |
| 6,745,787 B1 * | 6/2004 | Curtis | ............................ | 135/98 |
| 6,796,608 B2 * | 9/2004 | Ventimiglia et al. | ........ | 297/217.1 |
| 6,938,865 B1 * | 9/2005 | Day | ......................... | 248/229.14 |
| 6,991,202 B2 * | 1/2006 | Carmona | .................. | 248/229.14 |
| 7,051,839 B1 * | 5/2006 | George | .......................... | 182/116 |
| 7,159,256 B1 * | 1/2007 | Licari | ............................. | 5/417 |
| 7,178,777 B1 * | 2/2007 | Banker | ....................... | 248/316.7 |
| 7,431,041 B2 * | 10/2008 | Wu | .................................. | 135/21 |
| 7,661,224 B1 * | 2/2010 | Poyas | ............................... | 47/42 |
| 7,789,352 B2 * | 9/2010 | Darling, III | ................... | 248/74.4 |
| 7,828,003 B2 * | 11/2010 | Montecucco | ................... | 135/98 |
| 8,356,784 B2 * | 1/2013 | Doll et al. | ................ | 248/229.13 |
| 2002/0046480 A1 * | 4/2002 | Kowalski | ............................ | 43/1 |
| 2008/0099655 A1 * | 5/2008 | Goodman | ..................... | 248/674 |
| 2011/0121149 A1 * | 5/2011 | Herskovic | ............ | A61G 7/0503 248/223.41 |
| 2013/0233988 A1 * | 9/2013 | Johnson | ............... | G03B 17/561 248/229.14 |
| 2014/0191103 A1 * | 7/2014 | Simon | ........................... | 248/558 |
| 2014/0332645 A1 * | 11/2014 | Brooks | ......................... | 248/156 |

* cited by examiner

*Primary Examiner* — Monica Millner

(57) ABSTRACT

A clamping device for camouflage comprising of a support structure clamp and a object holder clamp is a light weight, foldable clamping device for camouflage and is easy to carry and use. A user can easily attach one or more tree branches to a tree stand through the clamping device of the present invention and then position the tree branches in any desired direction to blend in with the surrounding. To attach the clamping device for camouflage to a tree stand and, to attach a tree branch to the clamping device for camouflage, no tool is required as the user can perform all the screwing and unscrewing actions with bare hands.

4 Claims, 8 Drawing Sheets

CLAMPING DEVICE FOR CAMOUFLAGE

FIELD OF THE INVENTION

The present invention generally relates to hunting accessories. More particularly, the present invention relates to a camouflage device adapted to be attached to any tree stand to facilitate seeing, but not being seen by the animal or the target.

BACKGROUND OF THE INVENTION

Tree stands are often utilized by hunters when hunting large game such as deer or elk to obtain an elevated hunting platform. As is well known by hunters, tree stands provide many practical advantages to the hunters with unobstructed views of a broad area of the woods thereby enhancing the hunter's chances of success. Stands also provide hunters with the ability to camouflage themselves above ground level, and further, are less likely to be scented by an animal since the hunter would be elevated above ground level. But it has been found that the chances of the hunter being sighted are not greatly reduced if the hunter is in an elevated position. Therefore, there is need for a device which can give greater camouflage to the hunters while they are on a tree stand.

Tree stands have developed as the sport of hunting has gained popularity. Essentially, the tree stand is designed to be leaned against and anchored relative to the trunk of a tree. A typical stand includes a foldable ladder for vertical access and a collapsible seat or platform for obtaining a comfortable and safe position while elevated. Therefore, there is need for a device which is adaptable to be attached to any tree stand for greater camouflage to the hunters while they are on a tree stand.

Since the hunter is often desirous of hunting in a remote location that is not accessible by motor vehicle, he must often transport hunting equipment and heavy game by himself. Thus, there have been developed tree stands that are foldable into a single compact unit for easy transportation and storage. Further, hunting equipment/accessories can be heavy and inconvenient to transport to and from a hunting location. Thus, there is need for a device which is easy for transportation and storage and can be easily carried with the tress stands and which is a desirable accessory adapted to be attached to any tree stand.

In addition to hunting large game, many hunters enjoy hunting small game such as turkey, duck and geese. Small game is hunted much differently than large game primarily due to a different hunting environment. Generally, small game hunting occurs in fields and streams while large game hunting occurs in wooded areas. Due to the extremely keen sight of small game and especially geese, it is imperative that the hunter be well camouflaged against the horizon. Thus, the hunter will often lie flat on the ground or dig a shallow grave to easily surround himself with camouflage. However, in such a flat position, it is difficult for the hunter to quickly move to a shooting position.

In as much as many hunters wish to hunt both large game and small game, it is desired to reduce the amount of equipment necessary for those who hunt both types of game. It is further desired to provide a device that can be selectively convertible between a tree branch holder and a ground level camouflage device.

Consequently, there exists in the art a long-felt need for a device which attaches to any tree stand such as a climbing stand, a ladder stand and a lock-on stand. There also exists in the art a long-felt need for a device which can be converted to a ground level camouflage device. Additionally, there is a long felt need in the art for a device which is easy for transportation and storage and can be easily carried with the tress stands. Finally, there is a long felt need in the art for a device that accomplishes all of the forgoing objectives and that is relatively inexpensive to manufacture, safe and easy to connect and use.

OBJECTS OF THE INVENTION

It is accordingly a principal object of the present invention to provide a device for camouflaging.

Another object of the present invention is to provide a device which can be attached to any type of tree stand.

A still another object of the present invention is to provide a device which can be removably and securely attached to any tree stand by a person by using bare hands without the use of any tool.

A further object of the present invention is to provide a device which provides for teethed jaws that can hold tree branches securely in place.

A still further object of the present invention is to provide a device which provides for a branch holder part that can be rotated completely in a 360 degree movement and adjusted completely in any direction.

Yet another object of the present invention is to provide a device which is easy for transportation and storage.

Still another object of the present invention is to provide a device which can be easily released from the support or tree stand to which it is attached.

Details of the foregoing objects and of the invention, as well as additional objects, features and advantages of the invention will become apparent to those skilled in the art upon consideration of the following detailed description of the preferred embodiments exemplifying the best mode of carrying out the invention as presently perceived.

SUMMARY OF THE INVENTION

It should be appreciated that this Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

Accordingly, there is presented a clamping device for camouflage which comprises of a support structure clamp designed to be clamped to the support structure i.e. frame of common types of tree stands and a substantially L-shaped object holder clamp designed to hold objects such as tree branches. The support structure clamp has a fixed first jaw and a movable second jaw. In a preferred embodiment of the present invention, fixed first jaw is fixed and movable second jaw is movable. In a preferred embodiment of the present invention, the support structure clamp further comprises of two quickly releasable/attachable clamping screws for propelling the movable second jaw towards the fixed first jaw. The clamping screws are of sufficient length to permit an engaging and disengaging movement between first jaw and a second jaw to accommodate the support structure of tree stand frames, the tree stands being any climbing stand, ladder stand, lock-on stand, etc. The clamping screws are used for propelling the movable second jaw toward the fixed first jaw such that the fixed first jaw and the movable second jaw are clamped by the clamping screws to detachably attach the clamping device for camouflage to a support structure of a tree stand. In a preferred embodiment of the present invention, the support structure clamp further comprises of a ball attached to the body of the fixed first jaw.

The fixed first jaw and the movable second jaw have openings through which the clamping screws work. The openings of the movable second jaw through which the clamping screws pass are unthreaded for quickly releasing/attaching the movable second jaw. The openings of the fixed first jaw through which the clamping screws pass through are internally threaded, the threads being made to match the threads of the clamping screws.

The substantially L-shaped object holder clamp comprises of a main body part having an extended portion. The main body part has a fixed third jaw and a movable fourth jaw. The fixed third jaw and the movable fourth jaw have jagged teeth on the inside of the jaws. In a preferred embodiment of the present invention, the substantially L-shaped object holder clamp further comprises of two quickly releasable/attachable clamping screws. The clamping screw is used for propelling the movable jaw toward the fixed jaw. The clamping screw is of sufficient length to permit an engaging and disengaging movement between fixed jaw and movable jaw. By propelling the movable jaw toward the fixed jaw, objects of variable sizes, such as tree branches of different sizes, can be clamped to the substantially L-shaped object holder clamp.

The extended portion has a split end. The extended portion is so designed that the split end of the extended portion can easily accommodate the ball of the support structure clamp thereby pivotally mounting the substantially L-shaped object holder clamp to the support structure clamp. The split end of the extended portion can be made to engage tightly with the ball by tightening the clamping screw to restrict pivotal movement of the substantially L-shaped object holder clamp with respect to support structure clamp. The clamping screw is of sufficient length to permit an engaging and disengaging movement between the split parts of the extended portion to engage with the ball of the support structure clamp. The clamping screw is joined to the movable jaw by a connection precluding axial motion of the jaw relative to the clamping screw but permitting the clamping screw to rotate freely with respect to the movable jaw. For this purpose the clamping screw has its end portion turned down to provide an annular shoulder to the flat top surface of the movable jaw.

The substantially L-shaped object holder clamp can be rotated with respect to the support structure clamp. The pivotal engagement of the object holder allows a user to position a tree branch clamped to the substantially L-shaped object holder clamp, at a desired position to provide camouflage to the user. After loosening the clamping screw, the substantially L-shaped object holder clamp can be rotated in any plane and, then, by tightening the screw clamping, the substantially L-shaped object holder clamp can be fixed at that position.

In another preferred embodiment, the clamping device for camouflage can be adapted to use in camouflaging while hunting at the ground level, for example, while hunting turkeys. Since, such hunting are mostly done sitting or lying on the ground, no tree stand is required.

The ground camouflage device comprises of a ground stake and one or more substantially L-shaped object holder clamps. The ground camouflage device can hold a camouflaging object, such as a tree branch, through the substantially L-shaped object holder clamp wherein the substantially L-shaped object holder clamp is pivotally mounted to the ball affixed to the stake section of the ground stake. In some embodiment, to provide flexibility, the ground stake can be made of multiple foldable stake sections of various lengths. The pointed bottom of the stake section can be pushed into the ground. The stake section can be bent with respect to the longitudinal axis of the stake section. In a preferred embodiment of the present invention, the stake sections are joined through a hinge which further includes an adjustable screw so that the stake sections can be made to stay affixed at any desired angle with respect to the longitudinal axes of each other. At the same time, the pivotally mounted substantially L-shaped object holder clamp allows a user to position the tree branch held by the object holder to any desired direction. The flexibility of multiple foldable stake sections, along with the flexibility provided by the pivotally mounted object holder clamp, make it possible to place a tree branch virtually at any desired position to provide perfect camouflage to the hunter.

Other systems and apparatuses according to embodiments will be or become apparent to one with skill in the art upon review of the following drawings and Detailed Description. It is intended that all such additional systems and apparatuses be included within this description, be within the scope of the present disclosure, and be protected by the accompanying claims.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Embodiments of the present invention are described herein in the context of a clamping device for camouflage to be attached to a support such as a tree stand to facilitate seeing, but not being seen by the animal or the target. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
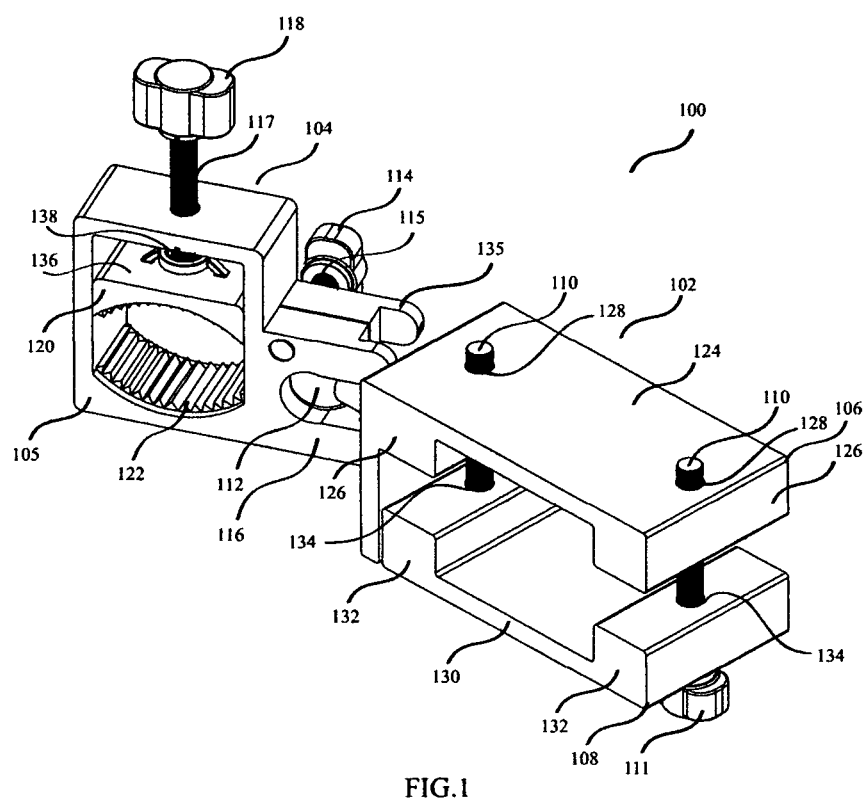
FIG. 1 illustrates a perspective view of a clamping device for camouflage in accordance with an embodiment of the present invention.

A clamping device for camouflage of the present invention generally indicated by 100 in FIG. 1 comprises, briefly, a support structure clamp 102 designed to be clamped to the support structure i.e. frame of common types of tree stands and a substantially L-shaped object holder clamp 104 designed to hold objects such as tree branches. Referring now to FIG. 1 with greater particularity, there is shown a support structure clamp 102 having a fixed first jaw 106 and a movable second jaw 108. In a preferred embodiment of the present invention, fixed first jaw 106 is fixed and movable second jaw 108 is movable. In a preferred embodiment of the present invention, the support structure clamp 102 further comprises of two quickly releasable/attachable threaded support structure clamping screws 110 for propelling the movable second jaw 108 towards the fixed first jaw 106. The two quickly releasable/attachable threaded support structure clamping screws 110 are of sufficient length to permit an engaging and disengaging movement between fixed first jaw 106 and a movable second jaw 108 to accommodate the support structure of tree stand frames, the tree stands being any climbing stand, ladder stand, lock-on stand, etc. The two quickly releasable/attachable threaded support structure clamping screws 110 are each being provided with heads 111 for convenient operation of the two quickly releasable/attachable threaded support structure clamping screws 110. The two quickly releasable/attachable threaded support structure clamping screws 110 are used for propelling the movable second jaw 108 toward the fixed first jaw 106 such that the fixed first jaw 106 and the movable second jaw 108 are clamped by the two quickly releasable/attachable threaded support structure clamping screws 110 to detachably attach the clamping device for camouflage 100 to a support structure (not shown in FIG. 1) of a tree stand. In a preferred embodiment of the present invention, the support structure clamp 102 further comprises of a ball 112 attached to the body of the fixed first jaw 106.

Still referring to FIG. 1, the fixed first jaw 106 and the movable second jaw 108 have openings through which the two quickly releasable/attachable threaded support structure clamping screws 110 work. The openings 134 of the movable second jaw 108 through which the two quickly releasable/attachable threaded support structure clamping screws 110 pass are unthreaded for quickly releasing/attaching the movable second jaw 108. The openings 128 of the fixed first jaw 106 through which the two quickly releasable/attachable threaded support structure clamping screws 110 pass through are internally threaded, the threads being made to match the threads of the two quickly releasable/attachable threaded support structure clamping screws 110. Still referring to FIG. 1 with greater particularity, the fixed first jaw 106 of the support structure clamp 102 defines a first rectangular base plate 124. The first rectangular base plate 124 is configured along a longitudinal axis of the support structure clamp 102 on opposite parallel edges to define a first pair of spaced flanges 126. One flange of the pair of spaced flanges 126 is stepped and longer than the other flange and the ball 112 is attached to this stepped and longer flange. The first rectangular base plate 124 have two internally threaded openings 128. The movable second jaw 108 defines a second rectangular base plate 130. The second rectangular base plate 130 is configured along said longitudinal axis on opposite parallel edges to define a second pair of spaced flanges 132. The second rectangular base plate 130 have two unthreaded openings 134. The two quickly releasable threaded support structure clamping screws 110 are receivable in the two internally threaded openings 128 and in said two unthreaded openings 134 to hold the fixed first jaw 106 and the movable second jaw 108 together with the first pair of spaced flanges 126 and the second pair of spaced flanges 132 facing each other.

In another preferred embodiment of the present invention, not shown in the figures, fixed first jaw 106 is made movable and movable second jaw 108 is fixed. In this preferred embodiment of the present invention, openings of the fixed first jaw 106, made movable in this embodiment, through which the quickly releasable/attachable threaded support structure clamping screws 110 pass through are unthreaded for quickly releasing/attaching the fixed first jaw 106 which is made movable in this embodiment. The openings of the movable second jaw 108, made fixed in this embodiment, through which the quickly releasable/attachable threaded support structure clamping screws 110 pass are made internally threaded.

In another preferred embodiment of the present invention, not shown in the figures, both the fixed first jaw 106 and the movable second jaw 108 are movable. In yet another preferred embodiment of the present invention, the fixed first jaw 106 and the movable second jaw 108 are hinged at one end. In this preferred embodiment, one quickly releasable/attachable threaded support structure clamping screw 110 of sufficient length to permit an engaging and disengaging movement between fixed first jaw 106 and a movable second jaw 108 is used.

Still referring to FIG. 1 with greater particularity, there is shown a substantially L-shaped object holder clamp 104 comprising of a main body part 105 having an extended portion 116. The main body part 105 has a fixed third jaw 122 and a movable fourth jaw 120. The fixed third jaw 122 and the movable fourth jaw 120 have jagged teeth on the inside of the jaws. In a preferred embodiment of the present invention, the substantially L-shaped object holder clamp 104 further comprises of one quickly releasable/attachable threaded object holder main body clamping screw 117 and one quickly releasable/attachable threaded object holder extended portion clamping screw 115. The quickly releasable/attachable threaded object holder main body clamping screw 117 is used for propelling the movable fourth jaw 120 toward the fixed third jaw 122. The quickly releasable/attachable threaded object holder main body clamping screw 117 is of sufficient length to permit an engaging and disengaging movement between fixed third jaw 122 and movable fourth jaw 120. By propelling the movable fourth jaw 120 toward the fixed third jaw 122, objects of variable sizes, such as tree branches of different sizes (not shown in FIG. 1), can be clamped to the substantially L-shaped object holder clamp 104.

The extended portion 116 has a split end 135. The extended portion 116 is so designed that the split end 135 of the extended portion 116 can easily accommodate the ball 112 of the support structure clamp 102 thereby pivotally mounting the substantially L-shaped object holder clamp 104 to the support structure clamp 102. The split end 135 of the extended portion 116 can be made to engage tightly with the ball 112 by tightening the quickly releasable/attachable threaded object holder extended portion clamping screw 115 to restrict pivotal movement of the substantially L-shaped object holder clamp 104 with respect to support structure clamp 102. The quickly releasable/attachable threaded object holder extended portion clamping screw 115 is of sufficient length to permit an engaging and disengaging movement between the split parts of the extended portion 116 to engage with the ball 112 of the support structure clamp 102. The quickly releasable/attachable threaded object holder main body clamping screw 117 and quickly releasable/attachable threaded object holder extended portion clamping screw 115 are each being provided with heads 118 and 114 respectively for convenient operation of the quickly releasable/attachable threaded object holder main body clamping screw 117 and quickly releasable/attachable threaded object holder extended portion clamping screw 115. The quickly releasable/attachable threaded object holder main body clamping screw 117 is joined to the movable fourth jaw 120 by a connection precluding axial motion of the movable fourth jaw 120 relative to the quickly releasable/attachable threaded object holder main body clamping screw 117 but permitting the quickly releasable/attachable threaded object holder main body clamping screw 117 to rotate freely with respect to the movable fourth jaw 120. For this purpose the quickly releasable/attachable threaded object holder main body clamping screw 117 has its end portion 138 turned down to provide an annular shoulder (not shown in figure) to the flat top surface 136 of the movable fourth jaw 120. In another preferred embodiment of the present invention, both the jaws of the substantially L-shaped object holder clamp 104 are made movable.

The support structure clamp 102 and the substantially L-shaped object holder clamp 104 can be made of any suitable material known in the art. The support structure clamp 102 and the substantially L-shaped object holder clamp 104 can be of any of geometrical shape. The two quickly releasable/attachable threaded support structure clamping screws 110 can be of any geometrical shape and can be made of any suitable material known in the art. The heads 111 can be of any geometrical shape and can be made of any suitable material known in the art.

Figure 2B:
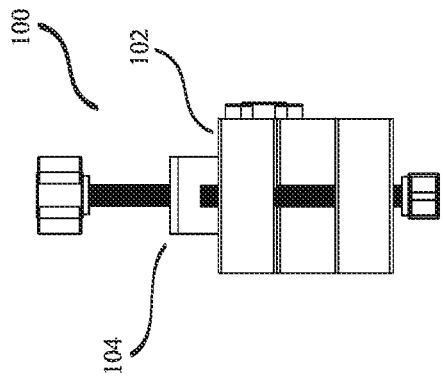
FIG. 2B shows side view of a clamping device for camouflage in accordance with an embodiment of the present invention.
Figure 2A:
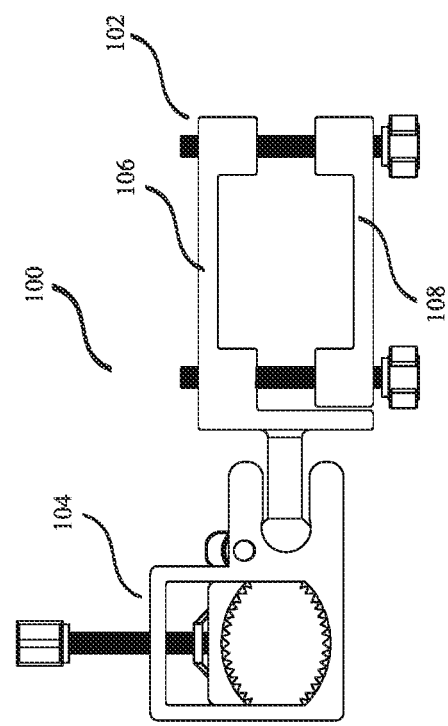
FIG. 2A shows front view of a clamping device for camouflage in accordance with another embodiment of the present invention.
Figure 2C:
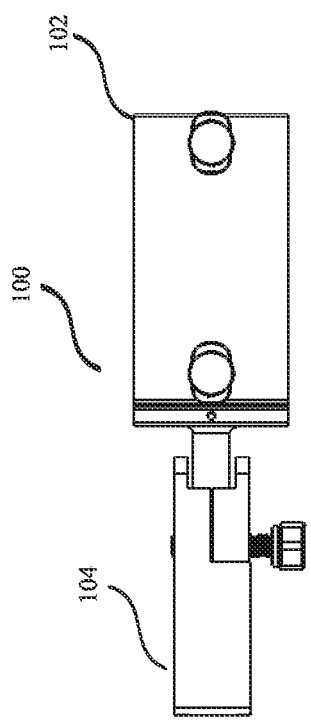
FIG. 2C shows top view of a clamping device for camouflage in accordance with an embodiment of the present invention.

FIG. 2A shows front view of a clamping device for camouflage 100 in accordance with one preferred embodiment of the present invention. In this embodiment of the present invention, as shown in FIG. 2A, the clamping device for camouflage 100 comprises of two distinct parts, the support structure clamp 102 and the substantially L-shaped object holder clamp 104 and as shown in FIG. 2A, the substantially L-shaped object holder clamp 104 is pivotally mounted to the support structure clamp 102. As best shown in FIG. 1 substantially L-shaped object holder clamp 104 is pivotally mounted to the support structure clamp 102 by accommodating the ball 112 attached to the stepped and longer flange of the first pair of spaced flanges 126 of the fixed first jaw 122 of the support structure clamp 102 in the split end 135 of the extended portion 116 of the substantially L-shaped object holder clamp 104. FIG. 2B shows side view of a clamping device for camouflage 100 in accordance with one preferred embodiment of the present invention. FIG. 2C shows side view of the clamping device for camouflage 100 in accordance with one preferred embodiment of the present invention.

Figure 3:
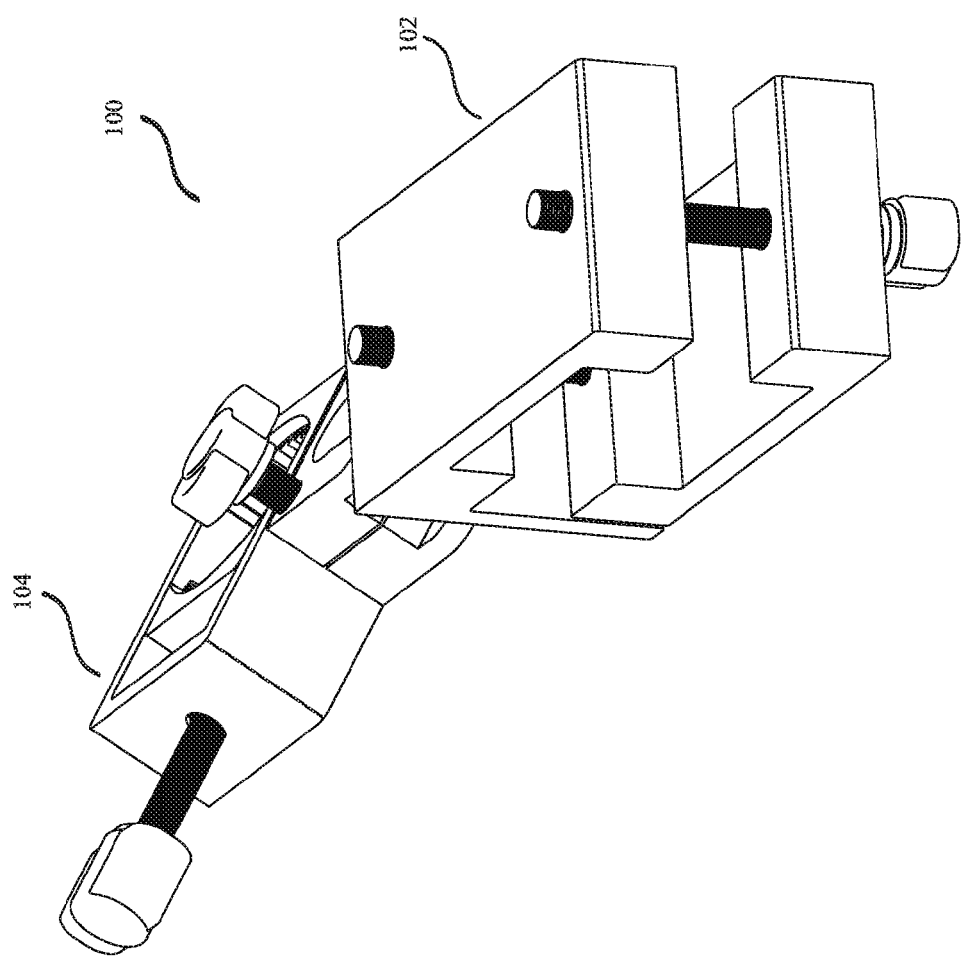
FIG. 3 illustrates how object holder clamp can be rotated with respect to the support structure clamp and fixed at a desired position by a user in accordance with an embodiment of the present invention.
Figure 4:
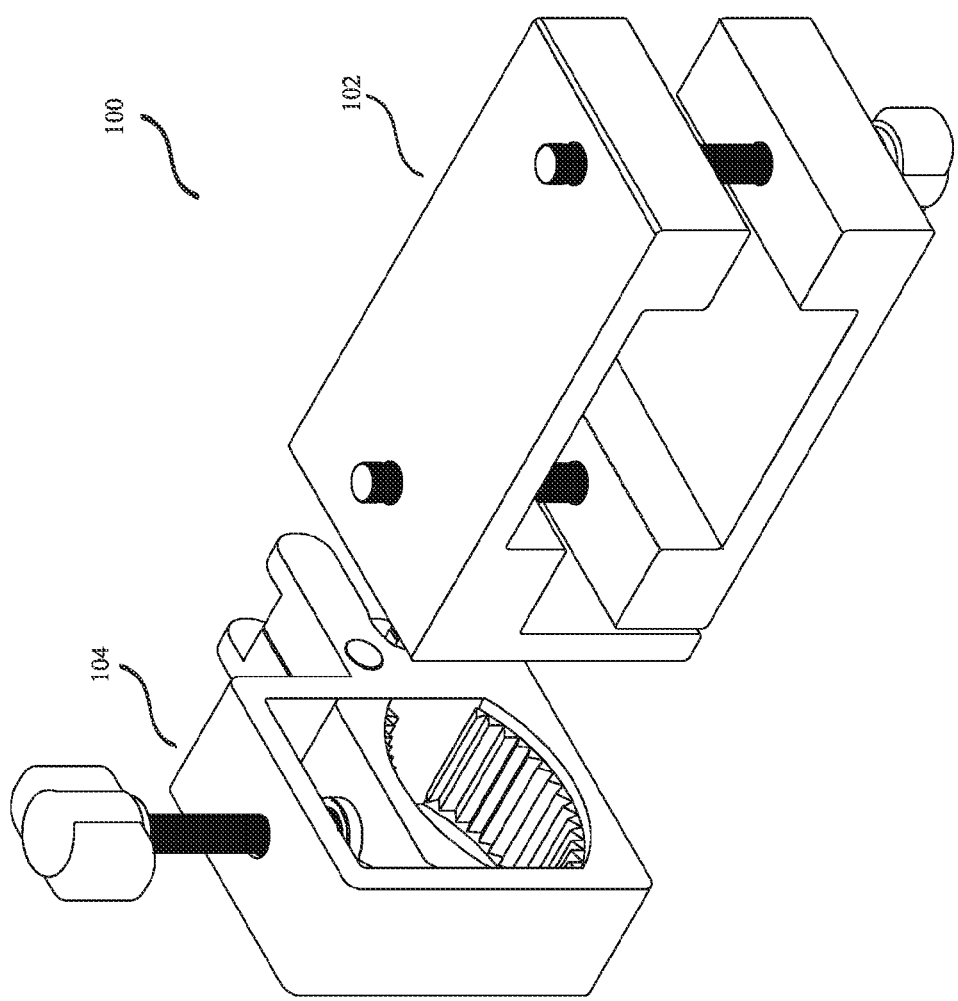
FIG. 4 illustrates how object holder clamp can be rotated with respect to the support structure clamp and fixed at a desired position by a user in accordance with another embodiment of the present invention.
Figure 5:
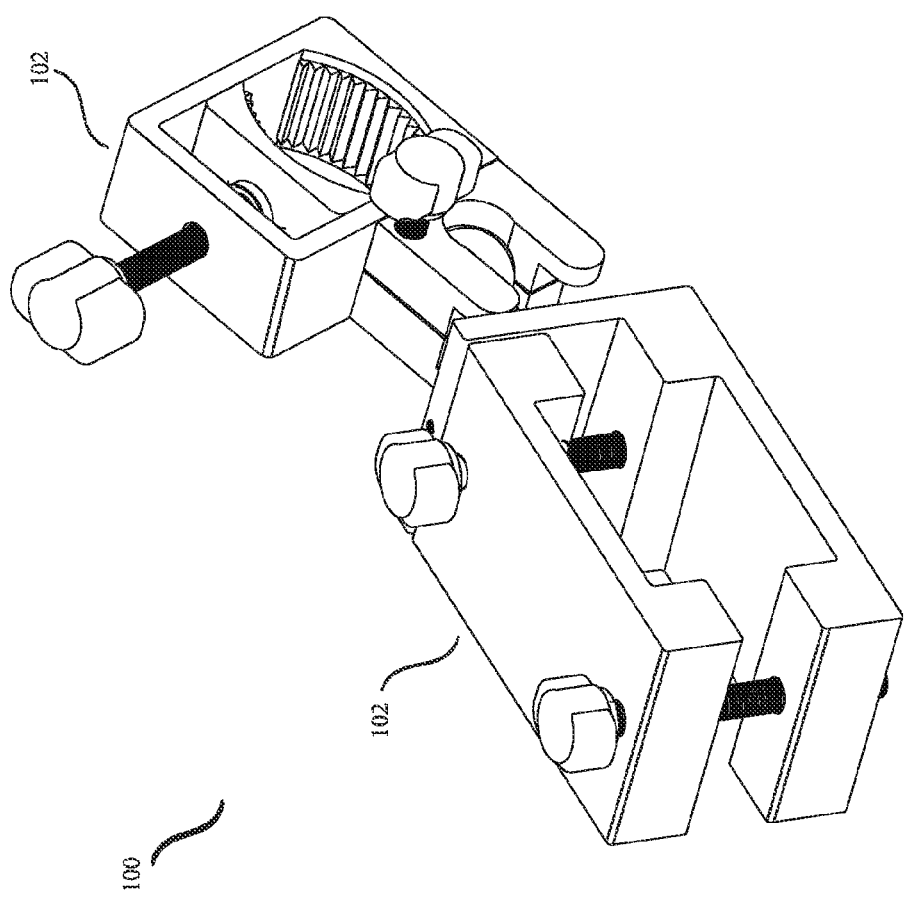
FIG. 5 illustrates how object holder clamp can be rotated with respect to the support structure clamp and fixed at a desired position by a user in accordance with yet another embodiment of the present invention.

FIGS. 3, 4 and 5 illustrate how the substantially L-shaped object holder clamp 104 can be rotated with respect to the support structure clamp 102. The pivotal engagement of the substantially L-shaped object holder clamp 104 allows a user to position a tree branch (not shown in these figures) clamped to the substantially L-shaped object holder clamp 104, at a desired position to provide camouflage to the user. After loosening the quickly releasable/attachable threaded object holder extended portion clamping screw 115, the substantially L-shaped object holder clamp 104 can be rotated in any plane and, then, by tightening the quickly releasable/attachable threaded object holder extended portion clamping screw 115, the substantially L-shaped object holder clamp 104 can be fixed at that position as shown in the FIGS. 3, 4 and 5. The substantially L-shaped object holder clamp 104 can be rotated in multiple axes to position the object at a desired direction to provide camouflage.

Figure 6:
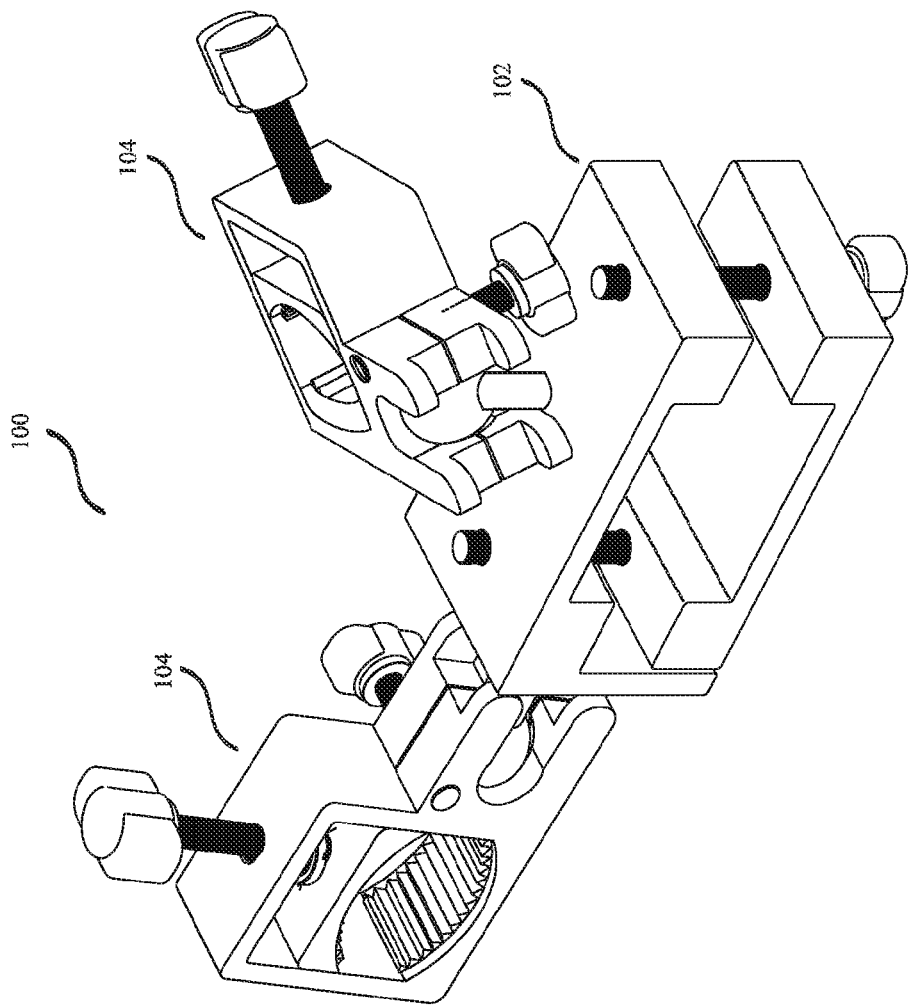
FIG. 6 illustrates a perspective view of a clamping device for camouflage having a support structure clamp and two object holder clamps in accordance with another embodiment of the present invention.

In some embodiments of the present invention, the clamping device for camouflage 100 may include more than one substantially L-shaped object holder clamps 104. FIG. 6 shows a clamping device for camouflage 100 comprising of three distinct parts, the support structure clamp 102 and two substantially L-shaped object holder clamps 104, and as shown in FIG. 6, the two substantially L-shaped object holder clamps 104 are pivotally mounted to the support structure clamp 102. As shown in FIG. 6, both the substantially L-shaped object holder clamps 104 can be rotated to position at different angles with respect to the support structure clamp 102 as preferred by a user, in accordance with one preferred embodiment of the present invention. As best illustrated in FIG. 6, the support structure clamp 102 comprises of a plurality of balls 112 attached to the body of the fixed first jaw 106. The substantially L-shaped object holder clamps 104 are pivotally attached to balls 112 of the support structure clamp 102.

In some embodiment of the present invention, the support structure clamp 102 can include one or more balls 112 attached to the body of the movable second jaw 108. In another preferred embodiment of the present invention, the support structure clamp 102 can further comprise of one or more balls 112 attached to the body of the movable second jaw 108.

Figure 7:
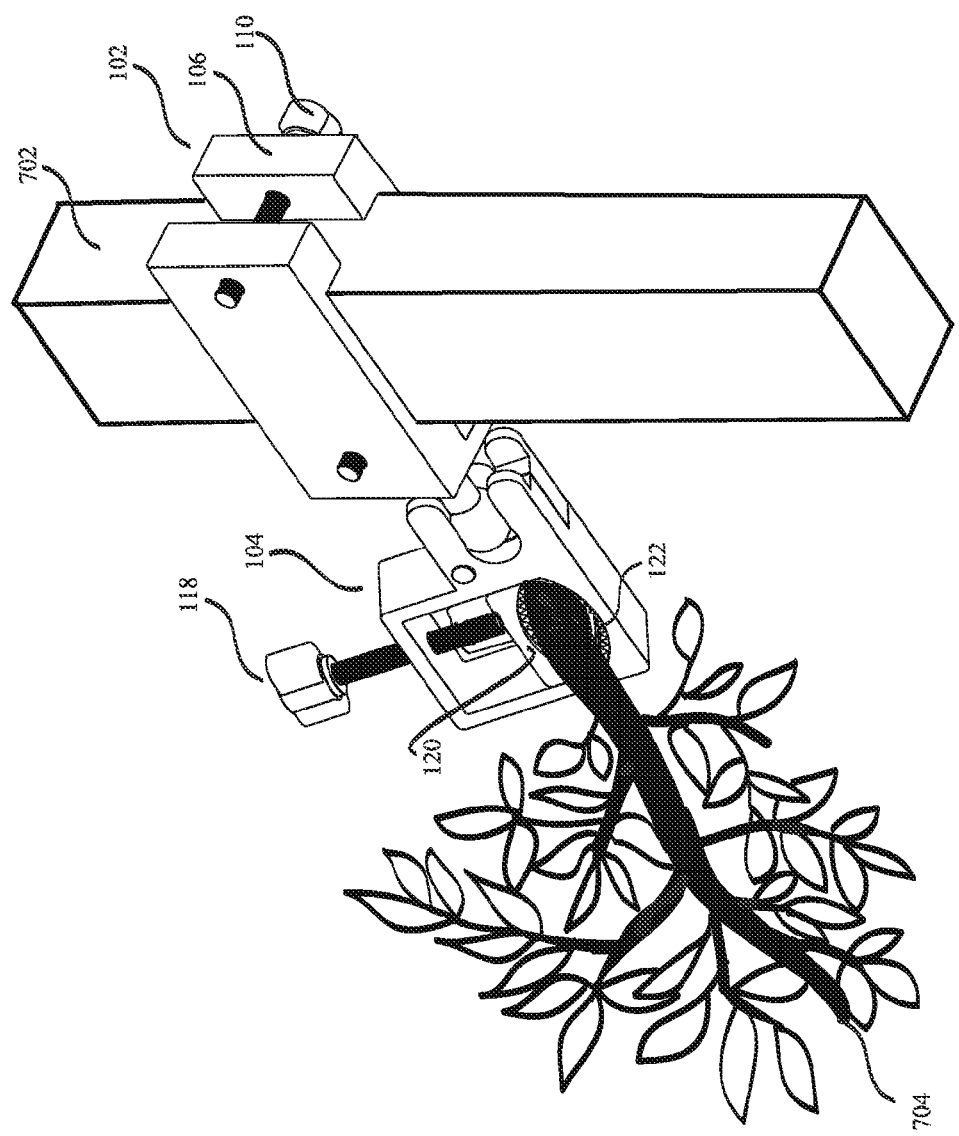
FIG. 7 illustrates a perspective view of a clamping device for camouflage wherein the support structure clamp is attached to a tree stand frame and a tree branch is attached to the object holder clamp in accordance with an embodiment of the present invention.

FIG. 7 illustrates the clamping device for camouflage 100 attached to a member 702 of a tree stand frame. For illustration purpose, only the member 702 of the tree stand frame to which the clamping device for camouflage 100 is attached to is shown in FIG. 7. As would be obvious to any person skilled in the art, although the clamping device for camouflage 100 is shown here being clamped to a member 702 of the tree stand with rectangular cross-section, the clamping device for camouflage 100 can be attached to any cross sectional structure. FIG. 7 also illustrates a tree branch 704 removably attached to the substantially L-shaped object holder clamp 104.

Still referring to FIG. 7, the support structure clamp 102 can be operated as follows: The support structure clamp 102 may be held in one hand and taken near a member 702 where it is to be clamped. For clamping the support structure clamp 102 to the member 702, the movable second jaw 108, which is movable in one preferred embodiment, is removed by unscrewing the quickly releasable threaded support structure clamping screws 110 and the fixed first jaw 106 is placed around the member 702 of the tree stand frame. The movable second jaw 108 is then placed back and the fixed first jaw 106 and the movable second jaw 108 are tightened on the support by turning the quickly releasable threaded support structure clamping screws 110 by rotating the heads 111. The fixed first jaw 106 and the movable second jaw 108 are first set to the approximate size of the member 702 by turning the quickly releasable threaded support structure clamping screws 110. Finally, the quickly releasable threaded support structure clamping screws 110 are rotated to apply clamping pressure so that the fixed first jaw 106 and the movable second jaw 108 tighten on the member 702.

Still further referring to FIG. 7, the substantially L-shaped object holder clamp 104 can be operated as follows: The extended portion 116 is pivotally mounted to the ball 112 of support structure clamp 102. After loosening the quickly releasable/attachable threaded object holder extended portion clamping screw 115 the substantially L-shaped object holder clamp 104 may be placed over the ball 112 between the split parts of the extended portion 116. The split parts . . . of the extended portion 116 are tightened over the ball 112 by turning the quickly releasable/attachable threaded object holder extended portion clamping screw 115. The split parts of the extended portion 116 are first set to the approximate size of the ball 112 by turning the quickly releasable/attachable threaded object holder extended portion clamping screw 115. Finally, the quickly releasable/attachable threaded object holder extended portion clamping screw 115 is rotated to apply clamping pressure so that the split parts of the extended portion 116 get tightened on the ball 112.

Still referring to FIG. 7, the substantially L-shaped object holder clamp 104 may be held in one hand and the camouflage article such as the tree branch 704 is inserted between the fixed third jaw 122 and the movable fourth jaw 120 and the movable fourth jaw 120 is tightened on the article by turning the quickly releasable/attachable threaded object holder main body clamping screw 117 by the head 114 with the other hand. The fixed third jaw 122 and the movable fourth jaw 120 are first set to the approximate size of the object such as the tree branch 704 by turning the quickly releasable/attachable threaded object holder main body clamping screw 117. Finally, the quickly releasable/attachable threaded object holder main body clamping screw 117 is rotated to apply clamping pressure so that the fixed third jaw 122 and the movable fourth jaw 120 tightens on the article such as the tree branch 704.

The light weight, foldable clamping device for camouflage 100 of the present invention is easy to carry and use. As described above, a user can easily attach one or more tree branches to a tree stand through the clamping device 100 and then position the tree branches in any desired direction to blend in with the surrounding. To attach the clamping device for camouflage 100 to a tree stand and, to attach a tree branch to the clamping device for camouflage 100, no tool is required as the user can perform all the screwing and unscrewing actions with bare hands.

In another preferred embodiment, the clamping device for camouflage 100 can be adapted to use in camouflaging while hunting at the ground level, for example, while hunting turkeys. Since, such hunting are mostly done sitting or lying on the ground, no tree stand is required.

Figure 8:
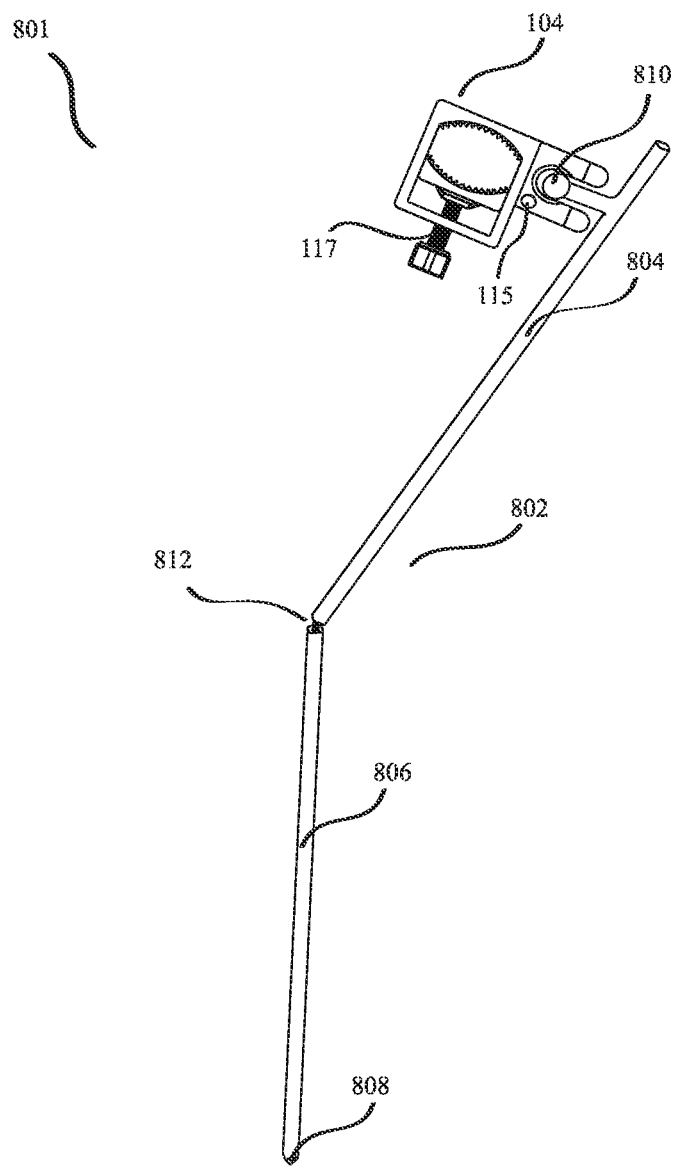
FIG. 8 illustrates a perspective view of a ground camouflage device in accordance with another embodiment of the present invention.

Accordingly, as best illustrated in FIG. 8, a ground camouflage device 801 is provided which can help a hunter to camouflage while hunting at ground level. The ground camouflage device 801 comprises of a ground stake 802 and one or more substantially L-shaped object holder clamps 104. The ground camouflage device 801, as illustrated in FIG. 8, can hold a camouflaging object, such as a tree branch, through the substantially L-shaped object holder clamp 104 wherein the substantially L-shaped object holder clamp 104 is pivotally mounted to the ball 810 affixed to the stake section 804 of the ground stake 802. In some embodiment, to provide flexibility, the ground stake 802 can be made of multiple foldable stake sections of various lengths. For illustration purpose, FIG. 8 shows the ground stake 802 of the present invention with just two stake sections 804 and 806 only. Reference to FIG. 8, to erect the ground stake 802 of the present invention, the pointed bottom 808 of the stake section 806 can be pushed into the ground. The stake section 804 can be bent with respect to the longitudinal axis of the stake section 806. In a preferred embodiment, the stake sections 804 and 806 are joined through a hinge 812 which further includes an adjustable screw (not shown in figures) so that the stake sections 804 and 806 can be made to stay affixed at any desired angle with respect to the longitudinal axes of each other. At the same time, the pivotally mounted object holder clamp 104 allows a user to position the tree branch held by the substantially L-shaped object holder clamp 104 to any desired direction. The flexibility of multiple foldable stake sections (e.g. stake sections 804 and 806), along with the flexibility provided by the pivotally mounted substantially L-shaped object holder clamp 104, make it possible to place a tree branch virtually at any desired position to provide perfect camouflage to the hunter.

Additionally, other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "connected", "fitted" are to be construed as partly or wholly contained within, attached to, or joined together, even if there is something intervening. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A clamping device for camouflage, comprising:
   at least one support structure clamp, said support structure clamp comprising a fixed first jaw defining a first rectangular base plate, said first rectangular base plate being configured along a longitudinal axis on opposite parallel edges to define a first pair of spaced flanges, one flange of said pair of flanges is stepped and longer than the other flange, said first rectangular base plate having two internally threaded openings, a movable second law defining a second rectangular base plate, said second rectangular base plate being configured along said longitudinal axis on opposite parallel edges to define a second pair of spaced flanges, said second rectangular base plate having two unthreaded openings, and two quickly releasable threaded support structure clamping screws receivable in said two internally threaded openings and in said two unthreaded openings to hold said fixed first jaw and said movable second jaw together with said first pair of spaced flanges and said second pair of spaced flanges facing each other; and
   at least one substantially L-shaped object holder clamp comprising a main body portion having a fixed third jaw and a movable fourth jaw, an extended portion having a split end, said extended portion extending from said main body portion, at least one quickly releasable threaded object holder main body clamping screw having its end portion turned down to provide an annular shoulder to rotatably fit into a flat top surface of said movable fourth jaw and at least one quickly releasable threaded object holder extended portion clamping screw, said at least one substantially L-shaped object holder clamp is pivotally mounted to said at least one support structure clamp by accommodating a ball attached to said stepped and longer flange of said first pair of spaced flanges of said fixed first jaw of said at least one support structure clamp in said split end of said extended portion of said at least one substantially L-shaped object holder clamp;
   wherein said at least one support structure clamp is removably attached to a support structure of a tree stand frame by propelling said movable second jaw towards said fixed first jaw after positioning said support structure in between said fixed first jaw and said movable second jaw whereby said two quickly releasable threaded support structure clamping screws are used for propelling said movable second jaw toward said fixed first jaw by passing said two quickly releasable threaded support structure clamping screws through said two internally threaded openings of said fixed first jaw and said two unthreaded openings of movable second jaw such that said fixed first jaw and said movable second jaw are clamped by said at least two quickly releasable threaded support structure clamping screws to detachably attach said clamping device and an object is removably attached to said at least one substantially L-shaped object holder clamp by propelling said movable fourth jaw of said main body portion towards said fixed third jaw of said main body portion after positioning said object said in between said fixed third jaw and said movable fourth jaw whereby said at least one quickly releasable threaded object holder main body clamping screw is used for propelling said movable fourth jaw toward said fixed third jaw to tightly clamp said object and said at least one substantially L-shaped object holder clamp is rotated in multiple axes to position said object at a desired direction to provide camouflage.

2. The clamping device for camouflage as in claim 1, wherein said at least one substantially L-shaped object holder clamp is locked in the desired location to restrict pivotal movement of said at least one substantially L-shaped object holder clamp with respect to said support structure clamp after placing said split end of said extended portion over said ball and said split end is tightened over said ball by turning said at least one quickly releasable threaded object holder extended portion clamping screw.

3. The clamping device for camouflage as in claim 1, wherein said two unthreaded openings of said second rectangular base plate through which said at least two quickly releasable threaded support structure clamping screws pass allow quick releasing/attaching of said movable second jaw.

4. The clamping device for camouflage as in claim 1, wherein said two internally threaded openings of said first rectangular base plate through which said two quickly releasable threaded support structure clamping screws pass matches with the threads of said two quickly releasable threaded support structure clamping screws.

* * * * *